US012746161B2

(12) United States Patent
Smith et al.

(10) Patent No.: US 12,746,161 B2
(45) Date of Patent: Sep. 29, 2026

(54) PERSON SUPPORT APPARATUS INCLUDING INTUBATION ASSISTANCE BLADDERS

(71) Applicant: Hill-Rom Services, Inc., Batesville, IN (US)

(72) Inventors: Kathryn Ruth Smith, Batesville, IN (US); Timothy Michael Volk, Cleves, OH (US); Jnanesha Ramegowda, Batesville, IN (US); Taylor Vohland, West Chester, OH (US)

(73) Assignee: HILL-ROM SERVICES, INC., Batesville, IN (US)

( * ) Notice: Subject to any disclaimer, the term of this patent is extended or adjusted under 35 U.S.C. 154(b) by 93 days.

(21) Appl. No.: 18/903,661

(22) Filed: Oct. 1, 2024

(65) Prior Publication Data

US 2025/0107950 A1 Apr. 3, 2025

Related U.S. Application Data

(60) Provisional application No. 63/587,560, filed on Oct. 3, 2023.

(51) Int. Cl.
*A61G 7/057* (2006.01)

(52) U.S. Cl.
CPC ...... *A61G 7/05769* (2013.01); *A61G 2203/10* (2013.01)

(58) Field of Classification Search
CPC .............. A61G 13/121; A61G 13/1215; A61G 13/1265; A61G 7/05769; A61G 7/05776; A61G 7/07; A61G 7/072; A61G 7/1021; A61G 2210/30; A61G 2203/10
USPC ............ 5/613, 713; 128/845, 200.24, 202.18
See application file for complete search history.

(56) References Cited

U.S. PATENT DOCUMENTS

| | | | | | |
|---|---|---|---|---|---|
| 4,005,498 | A * | 2/1977 | Starr | A61G 7/1021 | 5/81.1 R |
| 4,829,614 | A * | 5/1989 | Harper | A47G 9/1081 | 5/636 |
| 5,184,365 | A * | 2/1993 | Stafford | A61F 5/055 | 5/640 |
| 5,522,099 | A | 6/1996 | Heier | | |
| 5,528,783 | A * | 6/1996 | Kunz | A47C 20/048 | 5/644 |

(Continued)

FOREIGN PATENT DOCUMENTS

| | | | | |
|---|---|---|---|---|
| CN | 218129058 | U | * | 12/2022 |
| WO | 2022079377 | A1 | | 4/2022 |

OTHER PUBLICATIONS

Machine Translation of CN-218129058-U.*

*Primary Examiner* — David R Hare
(74) *Attorney, Agent, or Firm* — Dinsmore & Shohl LLP

(57) ABSTRACT

A person support apparatus including a person support surface having a head section and a foot section opposite the head section, a bladder positionable between a non-inflated state and an inflated state, the bladder positioned at the head section of the person support surface, a fluid supply device in fluid communication with the bladder, the fluid supply device storing a fluid, and a controller communicatively coupled to the fluid supply device and configured to operate the fluid supply device to deliver the fluid to the bladder and position the bladder between the non-inflated state and the inflated state.

18 Claims, 11 Drawing Sheets

(56) References Cited

U.S. PATENT DOCUMENTS

| | | | | | |
|---|---|---|---|---|---|
| 5,966,762 | A * | 10/1999 | Wu | A61G 7/05769 | 5/713 |
| 5,970,545 | A * | 10/1999 | Garman | A47C 20/027 | 5/632 |
| 5,970,550 | A * | 10/1999 | Gazes | A61G 7/065 | 5/713 |
| 6,038,722 | A * | 3/2000 | Giori | A47C 27/18 | 5/709 |
| 6,131,219 | A * | 10/2000 | Roberts | A47G 9/1027 | 5/636 |
| 6,151,735 | A * | 11/2000 | Koby | A47C 27/084 | 5/644 |
| 6,751,818 | B2 * | 6/2004 | Troop | A61G 7/072 | 5/636 |
| 6,832,398 | B2 * | 12/2004 | Borders | A61G 12/00 | 5/713 |
| 7,127,758 | B2 * | 10/2006 | Gabbay | A61G 13/1265 | 128/845 |
| 7,210,176 | B2 | 5/2007 | Weedling et al. | | |
| 7,213,596 | B2 * | 5/2007 | Saied | A61M 16/0497 | 128/845 |
| 7,444,693 | B2 * | 11/2008 | Russo | A61G 7/1021 | 5/81.1 R |
| 7,467,431 | B2 | 12/2008 | Weedling et al. | | |
| 7,716,763 | B2 * | 5/2010 | Nissen | A47C 20/025 | 5/644 |
| 7,832,034 | B2 * | 11/2010 | Liu | A47G 9/1081 | 5/636 |
| 8,286,282 | B2 | 10/2012 | Kummer et al. | | |
| 9,889,056 | B2 | 2/2018 | Bisher | | |
| 11,197,555 | B2 | 12/2021 | Wittekind et al. | | |
| 11,826,296 | B1 * | 11/2023 | Wilson | A61G 7/008 | |
| 2007/0181122 | A1 * | 8/2007 | Mulier | A61G 13/12 | 128/202.16 |
| 2008/0098527 | A1 * | 5/2008 | Weedling | A61G 7/07 | 5/633 |
| 2009/0222991 | A1 * | 9/2009 | Davis, III | A61G 7/07 | 5/644 |
| 2010/0229875 | A1 * | 9/2010 | Davis | A61G 13/1215 | 128/845 |
| 2011/0056502 | A1 * | 3/2011 | Davis | A61G 13/1265 | 128/845 |
| 2012/0266894 | A1 * | 10/2012 | Pi | A61G 13/121 | 128/845 |
| 2013/0198962 | A1 * | 8/2013 | Melcher | A47C 20/023 | 5/636 |
| 2014/0076331 | A1 * | 3/2014 | Cho | A61G 13/121 | 128/845 |
| 2016/0151222 | A1 * | 6/2016 | Pedro | A61M 16/06 | 128/203.29 |
| 2017/0252250 | A1 * | 9/2017 | Gabbay | A61G 13/08 | |
| 2022/0313526 | A1 * | 10/2022 | Kaikenger | A61G 13/1265 | |
| 2023/0126248 | A1 * | 4/2023 | Kerner | A61G 13/1215 | 5/640 |
| 2023/0130856 | A1 * | 4/2023 | Sandell | A61G 7/05776 | 5/634 |
| 2023/0270611 | A1 * | 8/2023 | Nissen | A61G 13/1215 | 128/845 |

* cited by examiner

PERSON SUPPORT APPARATUS INCLUDING INTUBATION ASSISTANCE BLADDERS

CROSS-REFERENCE TO RELATED APPLICATION

This application claims the benefit of U.S. Provisional Patent Application Ser. No. 63/587,560, filed Oct. 3, 2023, for "Person Support Apparatus Including Intubation Assistance Bladders," which is hereby incorporated by reference in its entirety including the drawings.

TECHNICAL FIELD

The present specification generally relates to person support apparatuses and, more specifically, person support apparatuses including devices for assisting with intubation.

BACKGROUND

Caregivers routinely need to intubate patients, which can include raising the patient's chest and tilting the patient's head backwards to aide in opening up the patient's airway. Current practice includes placing objects such as, for example, towels, sheets, and the like, behind the patient's shoulders to help elevate the patient's neck region to allow the patient's head to tilt backwards. This requires a separate caregiver, typically a nurse, to find the required objects and to properly position the patient and the objects relative to the patient. Using external objects is time consuming, cumbersome, and increases risk of contamination to the patient's garment, while also requiring the patient to be disturbed to complete the procedure.

SUMMARY

In one embodiment, a person support apparatus includes a person support surface having a head section and a foot section opposite the head section, a bladder positionable between a non-inflated state and an inflated state, the bladder positioned at the head section of the person support surface, a fluid supply device in fluid communication with the bladder, the fluid supply device storing a fluid, and a controller communicatively coupled to the fluid supply device and configured to operate the fluid supply device to deliver the fluid to the bladder and position the bladder between the non-inflated state and the inflated state.

In another embodiment, a method includes positioning a bladder within a support layer of a person support surface of a person support apparatus and at a head section of the person support surface, transmitting a signal from a controller to a fluid supply device in fluid communication with a bladder, and delivering, by the fluid supply device in response to receiving the signal from the controller, fluid stored within the fluid supply device to the bladder to position the bladder into an inflated state from a non-inflated state, wherein, when the bladder is in the inflated state, the bladder has a varying height across a longitudinal axis of the person support surface.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
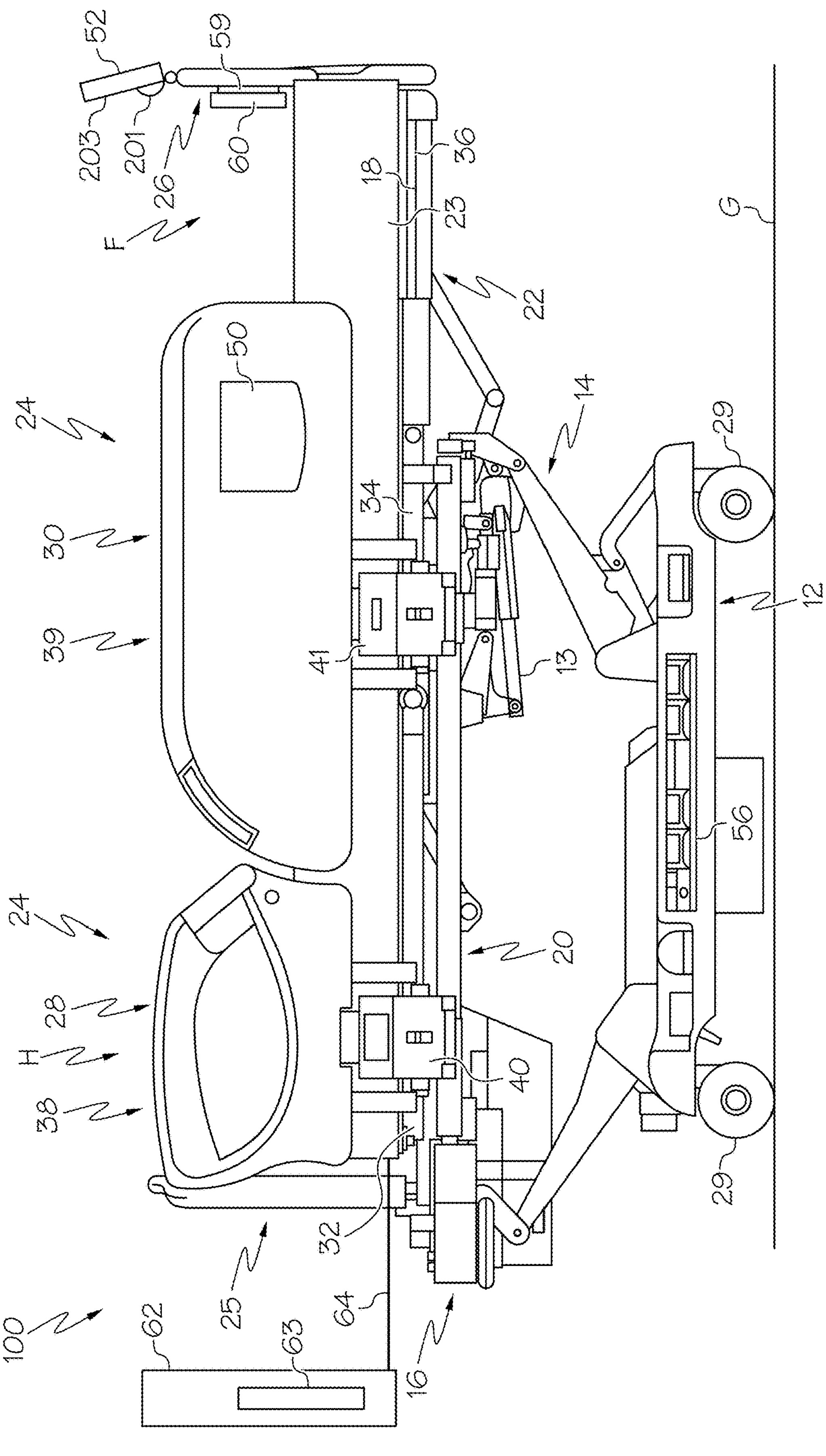
FIG. 1 schematically depicts a side view of an illustrative person support apparatus, according to one or more embodiments shown and described herein.

Embodiments described herein are directed to a person support apparatus that includes devices for supporting and positioning a person on top of the person support apparatus in a position suitable for intubation. The person support apparatus includes a person support surface having a head section and a foot section opposite the head section, a bladder operable between a non-inflated state and an inflated state, the bladder positioned at the head section of the person support surface, and a fluid supply device for delivering a fluid to the bladder and controlling the bladder between the non-inflated state and the inflated state. Various embodiments of the person support apparatus and the operation of the person support apparatus are described in more detail herein. Whenever possible, the same reference numerals will be used throughout the drawings to refer to the same or like parts. By providing a bladder positioned relative to the head section of the person support apparatus and operable between a non-inflated state and an inflated state, the person may be positioned without utilizing external objects. As noted herein, positioning such external objects increase risk of contamination and disrupt the person prior to intubation.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

A person support apparatus 100 according to various embodiments is depicted in FIG. 1. The person support apparatus 100 can be, for example, a hospital bed, a stretcher, a patient lift, a chair, an operating table, or similar support apparatuses commonly found in hospitals, nursing homes, rehabilitation centers or the like. As shown in FIG. 1, the person support apparatus 100 includes a base frame 12, a plurality of lift members 14 coupled to the base frame 12, and an upper frame 16 movably supported by the plurality of lift members 14 above the base frame 12. The base frame 12 includes a plurality of wheels or casters 29 that are movable along ground surface G. In various embodiments, the person support apparatus 100 includes a support surface 18 that is supported by the upper frame 16. The support surface 18 has a first section, designated as head end H, and a second section, designated as foot end F. The support surface 18 may be, for example, a deck 22. The deck 22 includes a head section 32, a seat section 34, and a foot section 36, which engage a bottom surface of a person support surface 23. The person support surface 23 defines a longitudinal axis extending from the head section 32 to the foot section 36.

The lift members 14 are coupled to various linear actuators 13 (such as jack motors and the like) and related mechanical and electrical components which facilitate raising, lowering, and tilting of the upper frame 16, and thus the support surface 18, with respect to the base frame 12. Tilting of the support surface 18 relative to the base frame 12 may also be referred to herein as orienting the support surface 18 in a Trendelenburg orientation or a reverse Trendelenburg orientation. In a Trendelenburg orientation, the head end H of the support surface 18 is lower than the foot end F of the support surface 18 while in a reverse Trendelenburg orientation, the foot end F of the support surface 18 is lower that the head end H of the support surface 18.

In embodiments, the upper frame 16 can include an upper frame base 20 which supports the deck 22. The person support apparatus 100 may further include side rails 24, a headboard 25, and a footboard 26. The side rails 24, the headboard 25, and the footboard 26 are supported by the upper frame 16, as shown in FIG. 1. The side rails 24, the headboard 25, and the footboard 26 are affixed to the upper frame 16 such that they generally define the perimeter edge of the upper frame 16. In some embodiments, the side rails 24 may include multiple sections. For example, in some embodiments, the side rails 24 may each include a head side rail 28, located adjacent to the head end H of the support surface 18, and an intermediate side rail 30 positioned between the head side rail 28 and the foot end F. At least one of the side rails 24 may include a first user interface 50 for control and/or display of the features of the person support apparatus 100. Foot pedal controls 56 may be coupled to the base frame 12 and communicatively coupled to one or more actuators, motors, or the like for raising and lowering the height of the upper frame 16.

As noted above, the upper frame base 20 is coupled to the lift members 14 and supports the support surface 18. In some embodiments, the foot section 36 may be coupled to the upper frame base 20 and moves between an extended position and a retracted position with respect to the upper frame base 20. For example, a linear actuator (not shown) may be coupled to the foot section 36 of the deck 22 in order to enable the length of the person support apparatus 100 to be adjusted. For example, the foot section 36, when extendable, may be retracted to shorten the length of the person support apparatus 100, but may be extended to lengthen the person support apparatus 100. In embodiments, automatic (i.e., active) extension and retraction of the foot section 36 may be accomplished with the actuator, which may automatically extend and retract the foot section 36 based on signals received from a control unit. In embodiments, the foot section 36 may also be slidable with respect to the upper frame base 20 such that the actuator provides a passive assist in facilitating leg presses. As such, the subject presses against the foot section 36, thereby extending the actuator and sliding the foot section 36 away from the upper frame base 20.

In some embodiments, the head side rail 28 is coupled to the head section 32 of the deck 22 and the intermediate side rail 30 is coupled to the seat section 34 of the deck 22. The head side rail 28 includes a side rail body 38 and a movement assembly 40. The side rail movement assembly 40 movably couples the side rail body 38 to the upper frame 16 and move the side rail body 38 between a deployed position and a stowed position. When the head side rail 28 is in the deployed position, at least a portion of the head side rail 28 is positioned above the deck 22 and/or the person support surface 23. When the head side rail 28 is in the stowed position, the head side rail 28 is positioned below at least the person support surface 23. In embodiments, the head side rail 28 may also be positioned below the deck 22 when in the stowed position. In some embodiments, the movement assembly 40 includes a locking mechanism (not shown) that maintains the side rail body 38 in the deployed position and/or the stowed position.

The intermediate side rail 30 includes a side rail body 39 and a movement assembly 41. The side rail movement assembly 41 movably couples the side rail body 39 to the upper frame 16 and move the side rail body 39 between a deployed position and a stowed position. When the intermediate side rail 30 is in the deployed position, at least a portion of the intermediate side rail 30 is positioned above the deck 22 and/or the person support surface 23. When the intermediate side rail 30 is in the stowed position, the intermediate side rail 30 is positioned below at least the person support surface 23. In embodiments, the intermediate side rail 30 may also be positioned below the deck 22 when in the stowed position. In some embodiments, the movement assembly 41 includes a locking mechanism (not shown) that maintains the side rail body 39 in the deployed position and/or the stowed position.

The head section 32 and the foot section 36 are each movable relative to the seat section 34. For example, the head section 32 and the foot section 36 pivotally raise and lower relative to the seat section 34. The person support surface 23 is flexible such that it can be articulated along with the support surface 18, as discussed below. The person support apparatus 100 includes one or more motors or actuators, which in some embodiments, include linear actuators with electric motors to move the head section 32 and the foot section 36 relative to upper frame 16 and operate the lift members 14 to raise, lower, and tilt the upper frame 16 relative to base frame 12. It should be appreciated that these actuators are separate and distinct from the actuators that form the lift members 14 provided between the base frame 12 and the upper frame 16 for moving the upper frame 16 relative to the base frame 12. These actuators are well-known in the hospital bed art and thus, are not illustrated herein. Alternative actuators or motors contemplated by this disclosure include hydraulic cylinders and pneumatic cylinders, for example.

In the illustrative embodiment, the seat section 34 is fixed in position with respect to the upper frame 16 as the deck 22 moves between its various subject supporting positions including a horizontal position, shown in FIG. 1, to support the subject in a supine position, for example, and a chair position, to support the subject in a sitting up position. In embodiments, the seat section 34 moves relative to the base frame 12, such as by pivoting and/or translating the entire deck 22. Of course, in those embodiments in which seat section 34 pivots and/or translates, the head section 32 and the foot section 36 also move along with seat section 34.

The person support apparatus 100 further includes a plurality of user interfaces. In the embodiment of the person support apparatus 100 shown in FIG. 1, a first user interface 50 is located on an outer surface of one of the intermediate side rails 30. A second user interface 52 is coupled to the footboard 26. However, it should be understood that the user interfaces 50, 52 may be located elsewhere on the person support apparatus 100. In embodiments, the user interface 52 may include a speaker 201 and/or a display 203. Each of the user interfaces 50, 52 includes user interface hardware components such as buttons, joysticks, touchscreens, and other suitable user controls for operating the respective user interface 50, 52. In embodiments, the user interface 52 may be communicatively coupled to a pressure surface 60 which is mounted to the footboard 26 of the person support apparatus. In the embodiment shown in FIG. 1, the footboard 26 is located near the foot end F and extends above the support surface 18. The pressure surface 60 may include a sensor 59, such as a flexing force pressure sensor, which measures the amount of force applied to the sensor 59. As noted hereinabove, the second user interface 52 may be in the form of or include a display 203. The display 203 may be a touchscreen, LCD screen, or other suitable display.

In embodiments, the person support apparatus 100 further incudes a fluid supply device 62. The fluid supply device 62 includes a pump 63 for drawing in fluid, for example, air, water, gel, or the like, and a conduit 64 for delivering the fluid from the fluid supply device 62. As such, the conduit 64 interconnects the pump 63 of the fluid supply device 62 to one or more bladders positioned within the head section 32 of the person support surface 23, described in more detail herein. In embodiments, the pump 63 may be a manually operated pump such as, for example, a hand or foot pump. In other embodiments, the pump 63 may be a power operated pump such as, for example, a motorized pump.

Figure 2:
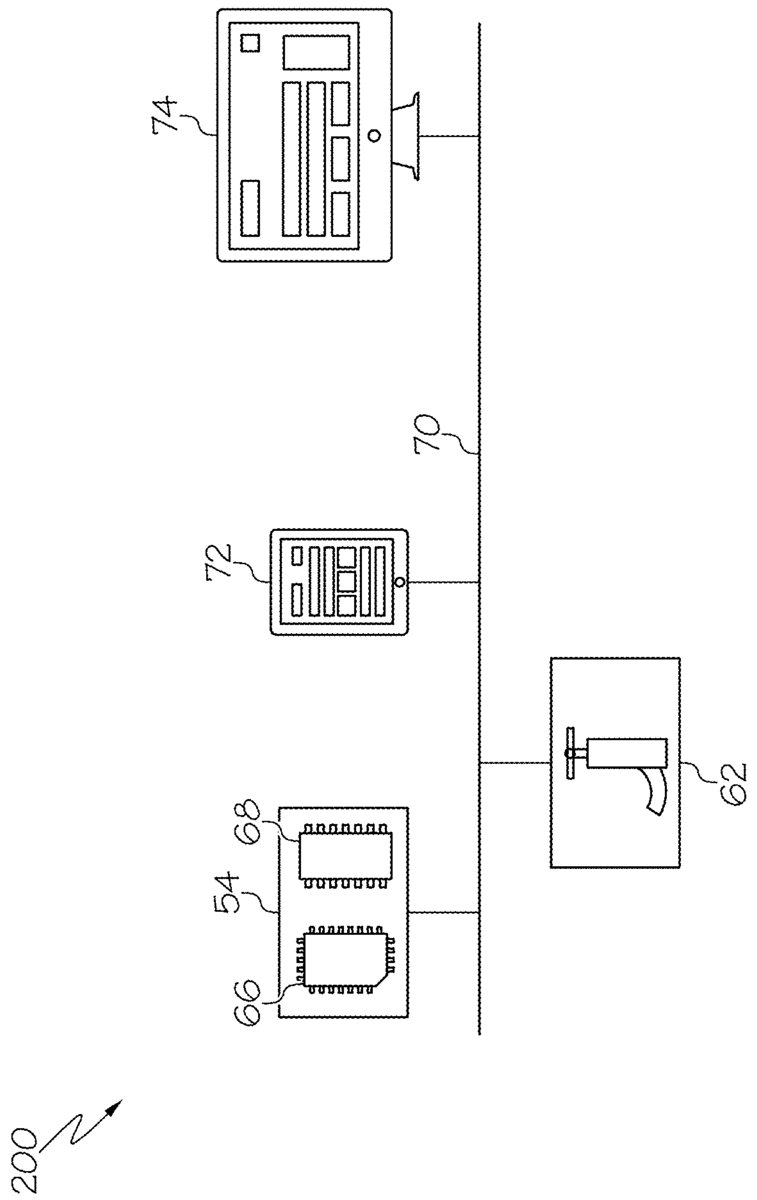
FIG. 2 schematically depicts components of a person support system, according to one or more embodiments shown and described herein.

Referring now to FIG. 2, components of a person support system 200 are illustrated. Although not illustrated in FIG. 2, it should be understood that the person support system 200 may include the person support surface 23 or may be a standalone system utilized as a retrofit or incorporated onto or into an existing person support assembly, such as the person support system 200.

As shown, in embodiments, the person support system 200 includes the fluid supply device 62 and the controller 54. The controller 54 includes one or more processors 66 and one or more memory modules 68. Each of the one or more processors 66 may be any device capable of executing machine readable and executable instructions. Accordingly, each of the one or more processors 66 may be an integrated circuit, a microchip, a computer, or any other computing device. The one or more processors 66 are coupled to a communication path 70 that provides signal interconnectivity between various modules of the person support system 200. The communication path 70 may communicatively couple any number of processors 66 with one another, and allow the modules coupled to the communication path 70 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

The one or more memory modules 68 may comprise RAM, ROM, flash memories, hard drives, or any device capable of storing machine readable and executable instructions such that the machine readable and executable instructions can be accessed by the one or more processors 66. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 68. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The communication path 70 may be formed from any medium that is capable of transmitting a signal such as, for example, conductive wires, conductive traces, optical waveguides, or the like. In some embodiments, the communication path 70 may facilitate the transmission of wireless signals, such as WiFi, Bluetooth®, Near Field Communication (NFC) and the like. Moreover, the communication path 70 may be formed from a combination of mediums capable of transmitting signals. In one embodiment, the communication path 70 comprises a combination of conductive traces, conductive wires, connectors, and buses that cooperate to permit the transmission of electrical data signals to components such as processors, memories, sensors, input devices, output devices, and communication devices. It is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

As described herein, the controller 54 may be communicatively coupled to the fluid supply device 62. Alternatively, the controller 54 may wirelessly communicate with the fluid supply device 62. Thus, as discussed in more detail herein, the controller 54 may be configured to operate the fluid supply device 62 between an activated state in which the fluid supply device 62 supplies fluid to or draws fluid from the bladders, and a deactivated state in which fluid is not actively supplied to or drawn from the bladders.

In embodiments, the person support system 200 also includes an input device 72. The input device 72 may be communicatively coupled to the controller 54 and other components of the person support system 200 via the communication path 70. The input device 72 includes one or more controls for operating the person support system 200 such as, for example, the fluid supply device 62. The one or more controls may be any suitable user operating controls such as, for example, buttons or tactile input on a touchscreen device.

In embodiments, the person support system 200 also includes a notification device 74 for providing a visual and/or audible output in response to the fluid supply device 62 being operated. The notification device 74 is coupled to the communication path 70 and communicatively coupled to the one or more processors 66. The notification device 74 may include any medium capable of transmitting an optical output such as, for example, a cathode ray tube, light emitting diodes, a liquid crystal display, a plasma display, or the like. Moreover, the notification device 74 may be a touchscreen that, in addition to providing optical information, detects the presence and location of a tactile input upon a surface of or adjacent to the display. Accordingly, the notification device 74 may receive mechanical input directly upon the optical output provided by the notification device 74. As such, the input device 72 may be incorporated into the notification device 74. The notification device 74 may also include a speaker for transforming data signals into mechanical vibrations, such as to output audible prompts or audible information.

In embodiments, the person support apparatus 100 may include one or more bladders positioned either above, within, or below the person support surface 23, such as between the person support surface 23 and the deck 22 (FIG. 1). As described in more detail herein, the bladders may be inflated, such as by the fluid supply device 62, to raise the shoulders of a person supported on top of the person support surface 23, and thus provide a desired positioning of the person's head, neck, and shoulders so that an intubation tube may be inserted into the person's mouth. Various embodiments of bladders are described in more detail herein.

Figure 3A:
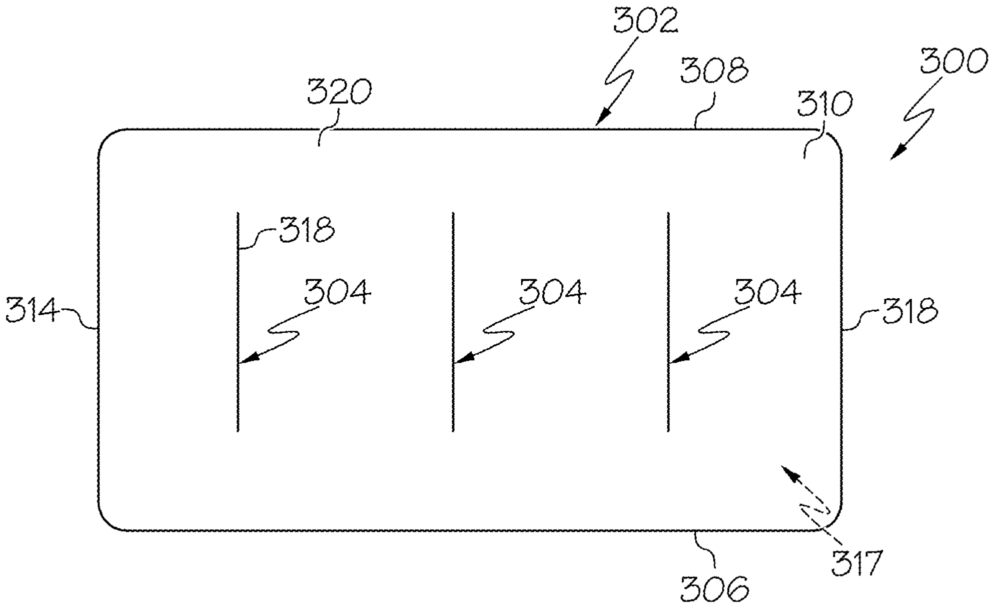
FIG. 3A schematically depicts a top view of an embodiment of a bladder in a non-inflated state, according to one or more embodiments shown and described herein.
Figure 3B:
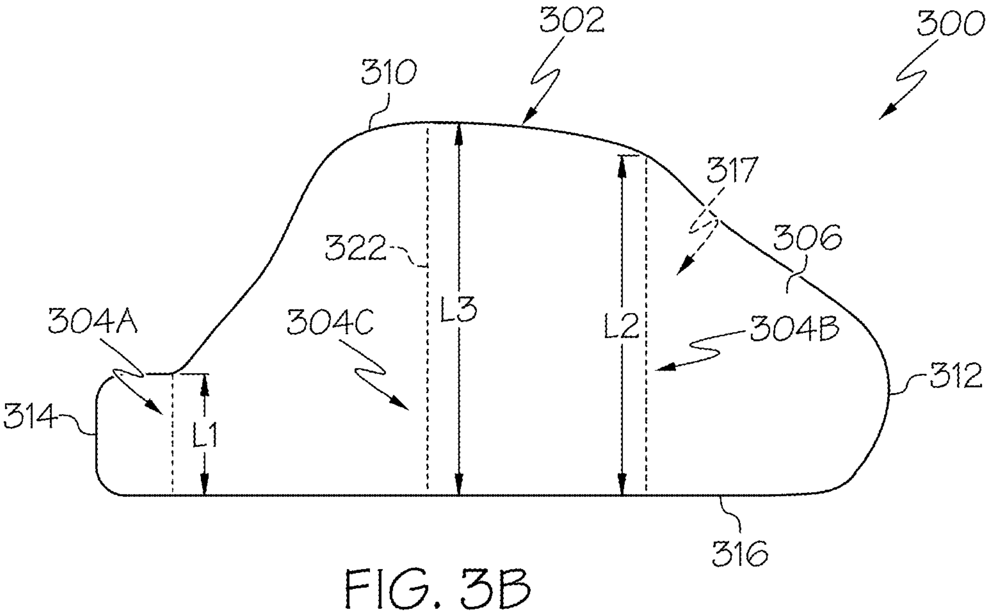
FIG. 3B schematically depicts a side view of the bladder of FIG. 3A in an inflated state, according to one or more embodiments shown and described herein.

Referring now to FIGS. 3A and 3B, a top view of an embodiment of a bladder 300 in a non-inflated state and a side view of the bladder 300 in an inflated state, respectively, are depicted. The bladder 300 includes a bladder body 302 and one or more baffles 304 extending through the bladder body 302. The bladder body 302 has a first side wall 306, a second side wall 308 opposite the first side wall 306, an upper wall 310 extending between the first side wall 306 and the second side wall 308 between a front end 312 and a rear end 314 of the bladder body 302, and a lower wall 316 extending between the first side wall 306 and the second side wall 308 between the front end 312 and the rear end 314 of the bladder body 302 and opposite the upper wall 310. The bladder body 302 defines an open interior 317 which is to be filled with a fluid by the fluid supply device 62 (FIG. 1) when in the inflated state depicted in FIG. 3B. Although reference is made to the bladder 300 being positioned between the non-inflated state and the inflated state, it should be appreciated that the bladder 300, as well as other embodiments of bladders discussed herein, are positionable into any one of a plurality of intermediate states between the non-inflated state and the inflated state by providing a reduced amount of fluid into the bladder 300.

As shown, the bladder 300 includes three baffles 304 spaced apart from one another along an axis extending between the front end 312 and the rear end 314 of the bladder body 302. In embodiments, the baffles 304 may be equidistantly spaced apart from one another. It should be appreciated that any number of baffles 304 may be utilized such as, for example, one baffle 304, two baffles 304, or more than three baffles 304. Each baffle 304 includes an exposed portion 318 provided along an outer surface 320 of the upper wall 310, which may be fixed to the upper wall 310 of the bladder body 302 in any suitable manner, and one or more extending portions 322 extending from the exposed portion 318 and to the lower wall 316 of the bladder body

302. The extending portion 322 is fixed to the lower wall 316 of the bladder body 302 in any suitable manner so as to restrict a height of the bladder body 302 at the baffle 304 when the bladder 300 is in the inflated state. In embodiments, the baffles 304 may be plate-shaped members extending between the upper wall 310 and the lower wall 316 of the bladder body 302. In other embodiments, the baffles 304 may be cables or tethers extending between the upper wall 310 and the lower wall 316 of the bladder body 302. Additionally, in embodiments in which the baffles 304 are cables or tethers, the baffles 304 may include a pair of extending portions 322 extending from opposite ends of the exposed portions 318 to form a substantially U-shaped member extending through the bladder body 302.

Additionally, the baffles 304 may have different lengths. For example, as shown in FIG. 3B, a first baffle 304A located closest to the rear end 314 of the bladder body 302 has a first length L1 extending in a vertical direction between the upper wall 310 and the lower wall 316 of the bladder body 302, a second baffle 304B located closest to the front end 312 of the bladder body 302 has a second length L2 extending in the vertical direction greater than the first length L1 of the first baffle 304A, and a third baffle 304C located between the first baffle 304A and the second baffle 304B has a third length L3 greater than the second length L2 of the second baffle 304B. Accordingly, with the bladder 300 in the inflated state, as shown in FIG. 3B, the bladder 300 has a height greatest toward a center of the bladder 300. However, it should be appreciated that the respective lengths of the baffles 304 may be adjusted in any manner other than those specific embodiments depicted herein to result in the desired positioning of the person.

Figure 4A:
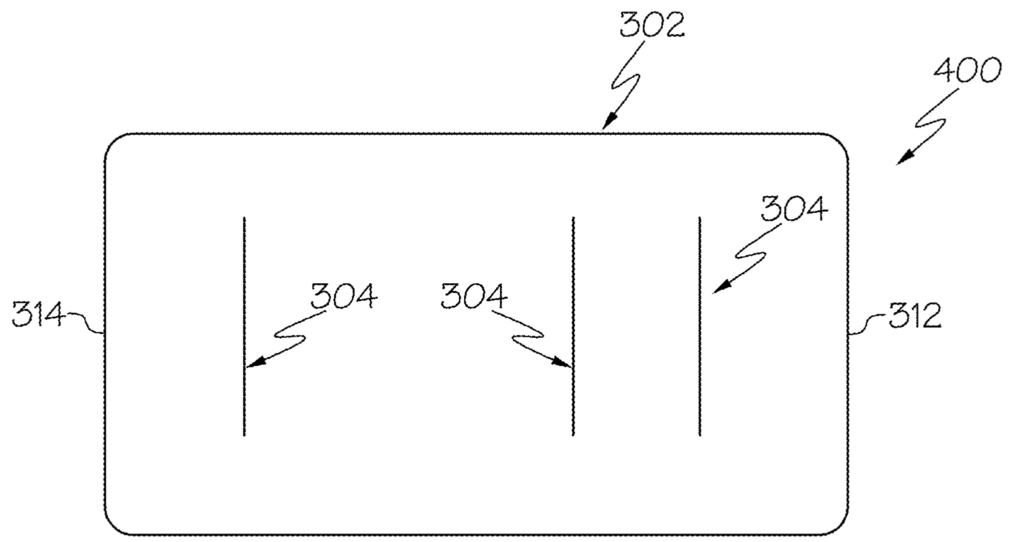
FIG. 4A schematically depicts a top view of another embodiment of a bladder in a non-inflated state, according to one or more embodiments shown and described herein.
Figure 4B:
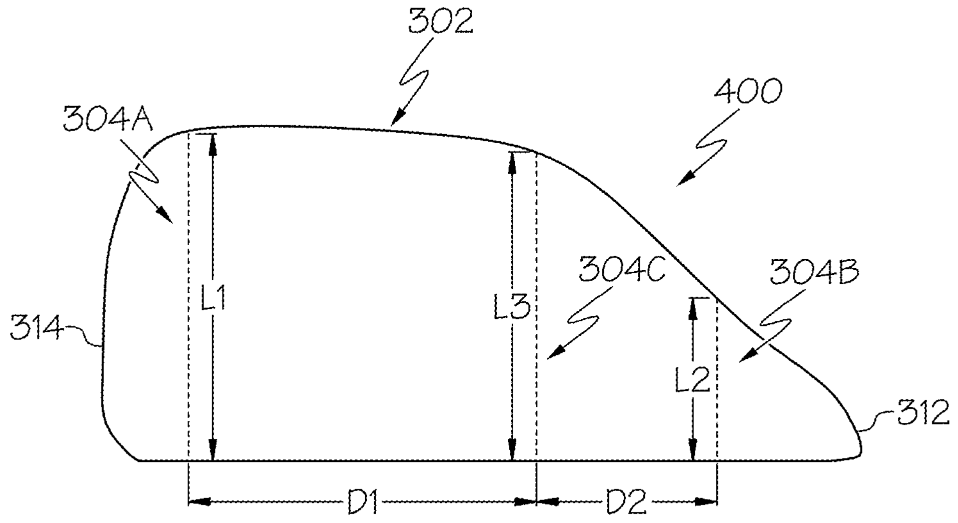
FIG. 4B schematically depicts a side view of the bladder of FIG. 4A in an inflated state, according to one or more embodiments shown and described herein.

Referring now to FIGS. 4A and 4B, a top view of another embodiment of a bladder 400 in a non-inflated state and a side view of the bladder 400 in an inflated state, respectively, are depicted. It should be appreciated that the bladder 400 is similar to the bladder 300 depicted in FIGS. 3A and 3B. Accordingly, similar reference numbers will be used to indicate like parts. As with the bladder 300 depicted in FIGS. 3A and 3B, the bladder 400 includes three baffles 304 spaced apart from one another. However, contrary to the bladder 300 depicted in FIGS. 3A and 3B, the first length L1 of the first baffle 304A located proximate the rear end 314 of the bladder body 302 is greater than the second length L2 of the second baffle 304B located proximate the front end 312 of the bladder body 302. Additionally, the first length L1 of the first baffle 304A located proximate the rear end 314 of the bladder body 302 is equal to the third length L3 of the third baffle 304C located between the first baffle 304A and the second baffle 304B. Accordingly, the bladder 400 has a height that tapers toward the front end 312 of the bladder body 302, while remaining substantially constant between the third baffle 304C and the rear end 314 of the bladder body 302. Additionally, contrary to the bladder 300 depicted in FIGS. 3A and 3B in which the baffles 304 are equidistantly spaced apart from one another, a first distance D1 between the first baffle 304A and the third baffle 304C of the bladder 400 is greater than a second distance D2 between the second baffle 304B and the third baffle 304C.

Figure 5A:
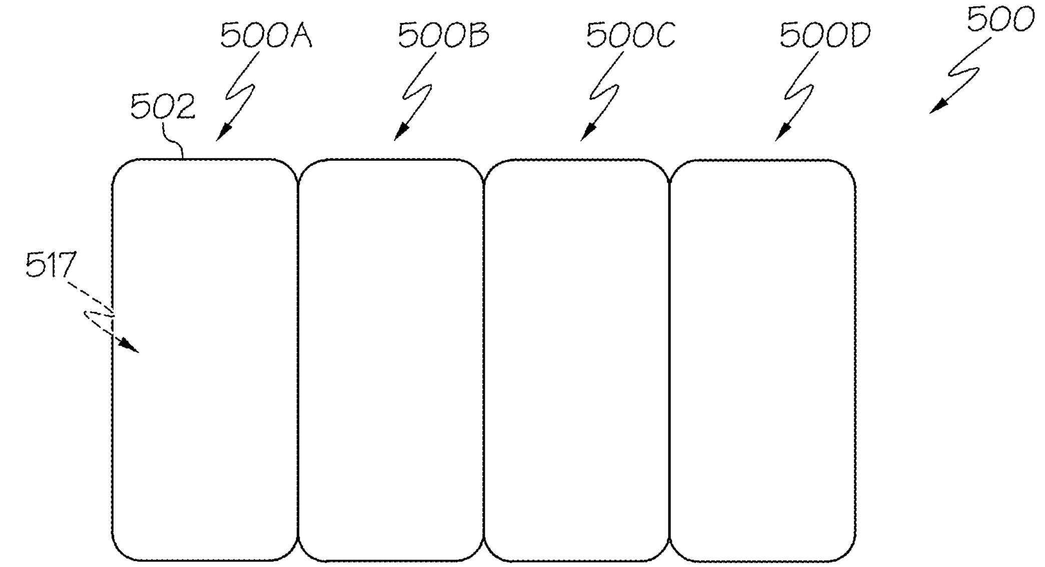
FIG. 5A schematically depicts a top view of another embodiment of a bladder in a non-inflated state, according to one or more embodiments shown and described herein.
Figure 5B:
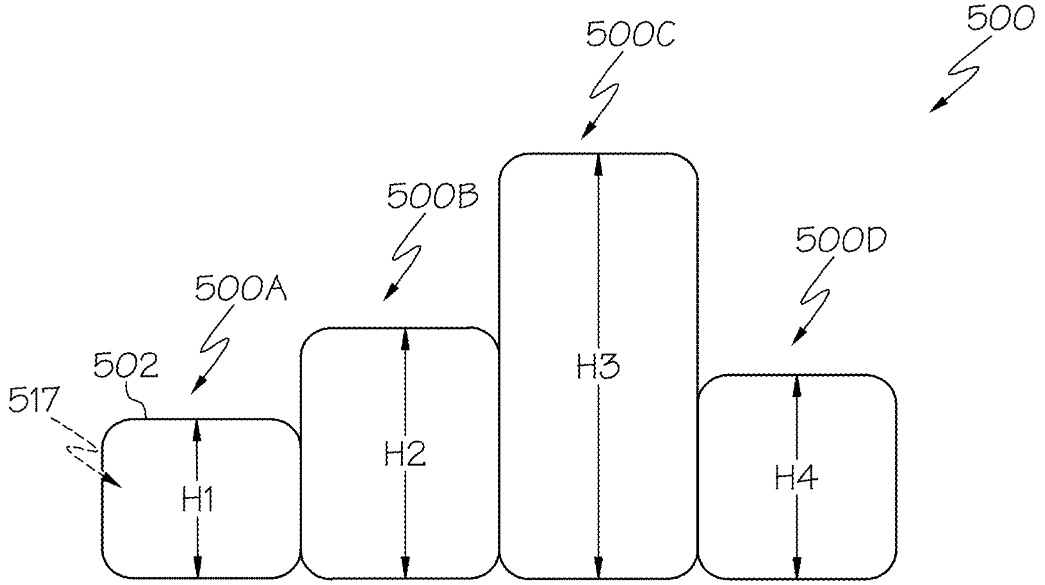
FIG. 5B schematically depicts a side view of the bladder of FIG. 5A in an inflated state, according to one or more embodiments shown and described herein.

Referring now to FIGS. 5A and 5B, a top view of another embodiment of a bladder 500 in a non-inflated state and a side view of the bladder 500 in an inflated state, respectively, are depicted. Here, the bladder 500 includes a plurality of bladder portions 500A-D arranged in a side-by-side manner along the longitudinal axis of the person support surface 23 (FIG. 1). In embodiments, the bladder portions 500A-D are directly fixed to one another. In other embodiments, the bladder portions 500A-D may be separated and positioned relative to one another. Although the bladder 500 is depicted as including four bladder portions 500A-D, it should be appreciated that the bladder 500 may include any number of bladder portions 500A-D such as three or more than four bladder portions 500A-D. Additionally, it should be appreciated that each bladder portion 500A-D includes a bladder body 502 defining an open interior 517 to be filled with a fluid by the fluid supply device 62 (FIG. 1). The bladder portions 500A-D may be filled either at the same time to the same pressure or, in embodiments, at different times to varying pressures using one or more pressure relief valves interconnecting the bladder portions 500A-D. In embodiments, the bladder portions 500A-D are each individually fluidly connected to the fluid supply device 56 (FIG. 1). In other embodiments, the bladder portions 500A-D are fluidly connected to one another and only one of the bladder portions 500A-D are fluidly connected to the fluid supply device 56 (FIG. 1). In embodiments, as shown in FIG. 5A, each bladder portion 500A-D has the same width. However, as shown in FIG. 5B, with the bladder portions 500A-D in the inflated state, the bladder portions 500A-D may have a different height. For example, a first bladder portion 500A has a first height H1, a second bladder portion 500B located adjacent the first bladder portion 500A has a second height H2 greater than the first height H1, a third bladder portion 500C located adjacent the second bladder portion 500B has a third height H3 greater than the second height H2, and a fourth bladder portion 500D has a fourth height H4 less than the second height H2 and greater than the first height H1. However, it should be appreciated that the respective heights of the bladder portions 500A-D may be adjusted in any manner other than those specific embodiments depicted herein to result in the desired positioning of the person.

Figure 6A:
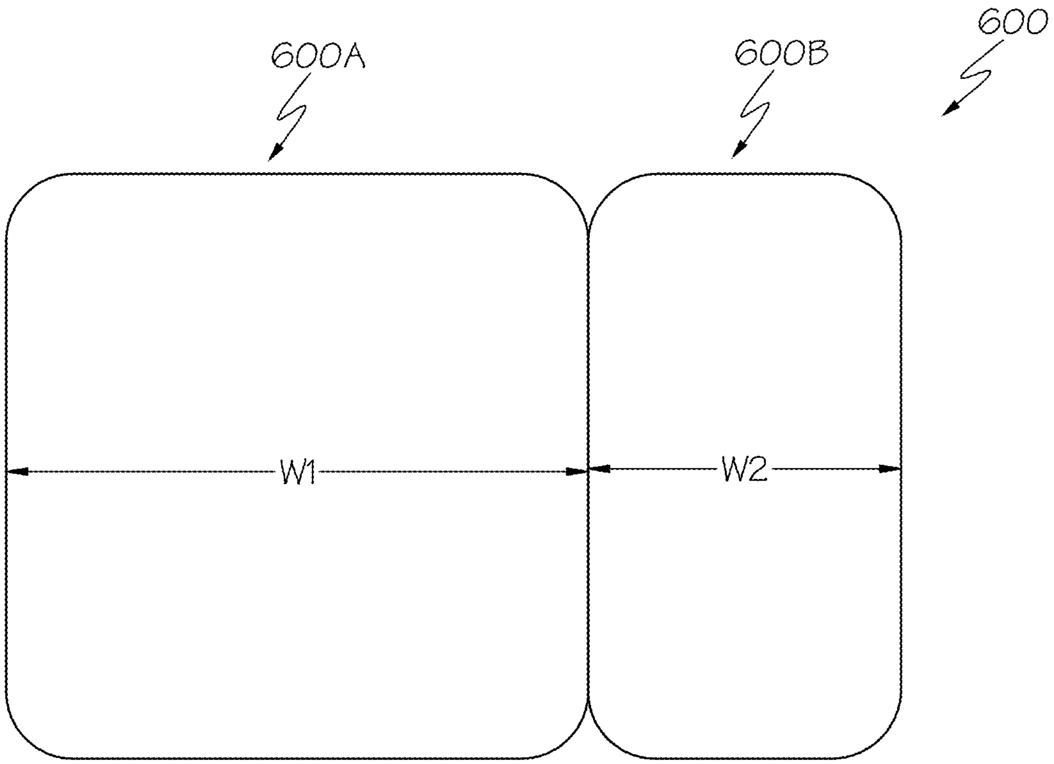
FIG. 6A schematically depicts a top view of another embodiment of a bladder in a non-inflated state, according to one or more embodiments shown and described herein.
Figure 6B:
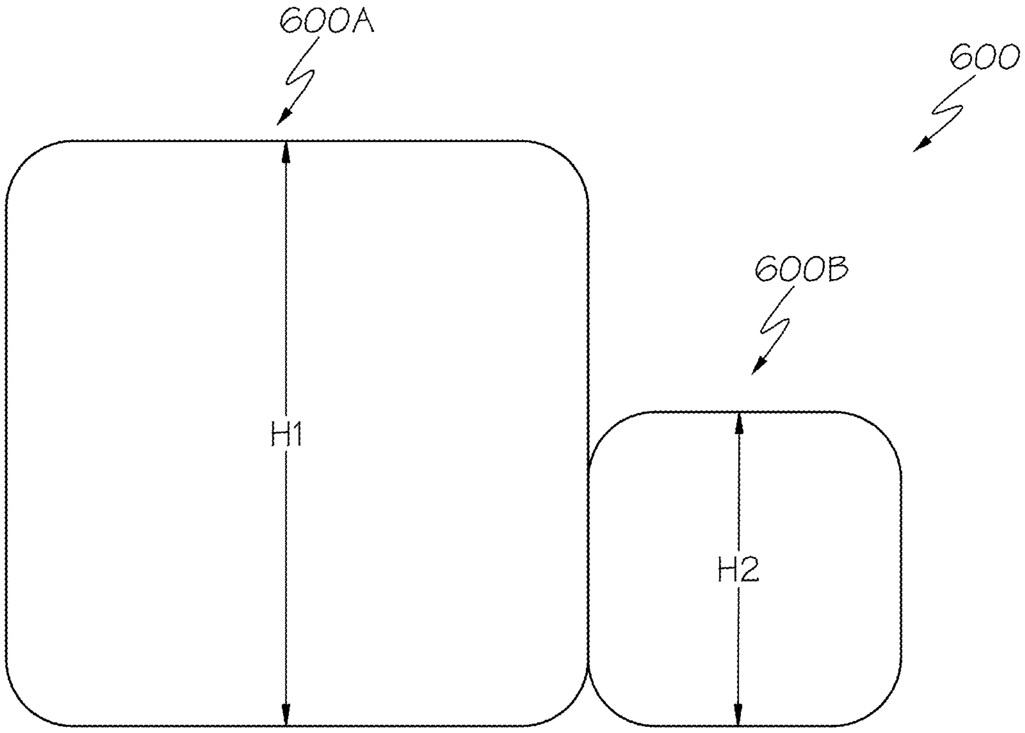
FIG. 6B schematically depicts a side view of the bladder of FIG. 6A in an inflated state, according to one or more embodiments shown and described herein.

Referring now to FIGS. 6A and 6B, a top view of another embodiment of a bladder 600 in a non-inflated state and a side view of the bladder 600 in an inflated state, respectively, are depicted. Here, the bladder 600 includes a pair of bladder portions 600A, 600B arranged in a side-by-side manner along the longitudinal axis of the person support surface 23 (FIG. 1). In embodiments, the bladder portions 600A, 600B are each individually fluidly connected to the fluid supply device 56 (FIG. 1). In other embodiments, the bladder portions 600A, 600B are fluidly connected to one another and only one of the bladder portions 600A, 600B are fluidly connected to the fluid supply device 56 (FIG. 1). In embodiments, as shown in FIG. 6A, the bladder portions 600A, 600B have a different width than one another. Specifically, a first bladder portion 600A has a first width W1, and a second bladder portion 600B has a second width W2 less than the first width W1. Additionally, as shown in FIG. 6B, with the bladder portions 600A, 600B in the inflated state, the bladder portions 600A, 600B may have a different height as well. For example, the first bladder portion 600A has a first height H1, and the second bladder portion 600B has a second height H2 less than the first height H1. However, it should be appreciated that the respective heights of the bladder portions 600A, 600B may be adjusted in any manner other than those specific embodiments depicted herein to result in the desired positioning of the person. For example, the first height H1 of the first bladder portion 600A may be less than the second height H2 of the second bladder portion 600B. Each bladder portion 600A, 600B is filled with a fluid by the fluid supply device 62 (FIG. 1). The bladder portions 600A, 600B may be filled either at the same time to the same pressure or, in embodiments, at different times to varying pressures using one or more pressure relief valves interconnecting the bladder portions 600A, 600B.

Figure 7A:
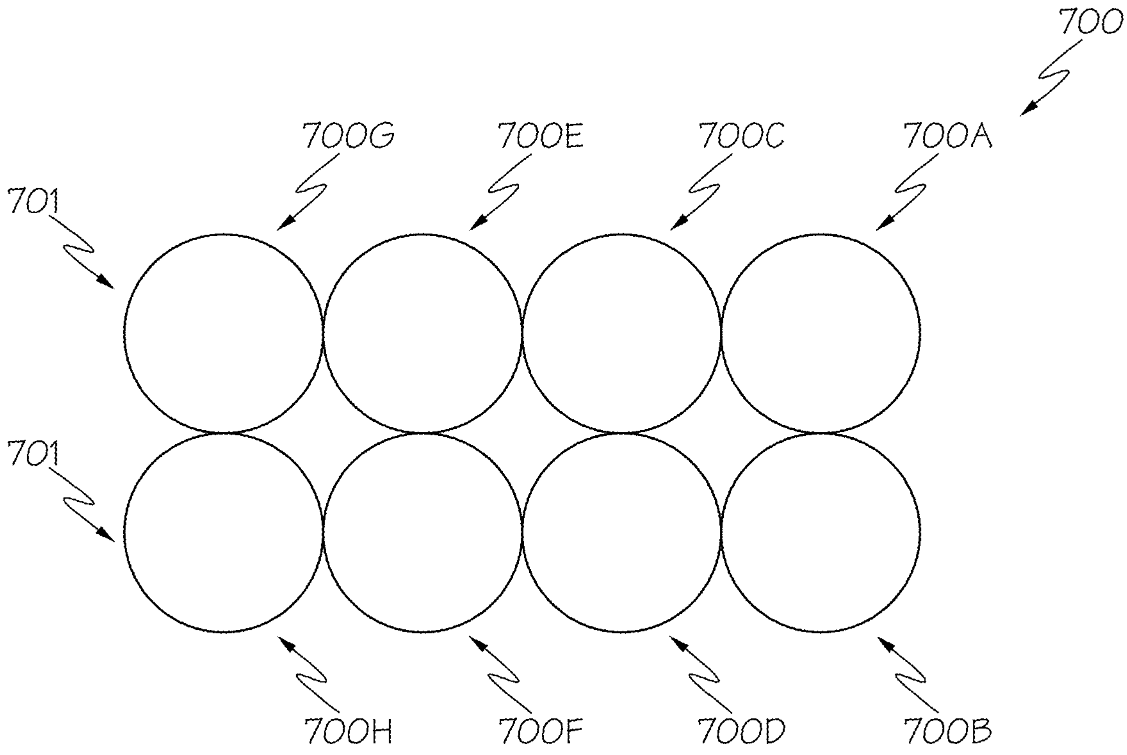
FIG. 7A schematically depicts a top view of another embodiment of a bladder in a non-inflated state, according to one or more embodiments shown and described herein.
Figure 7B:
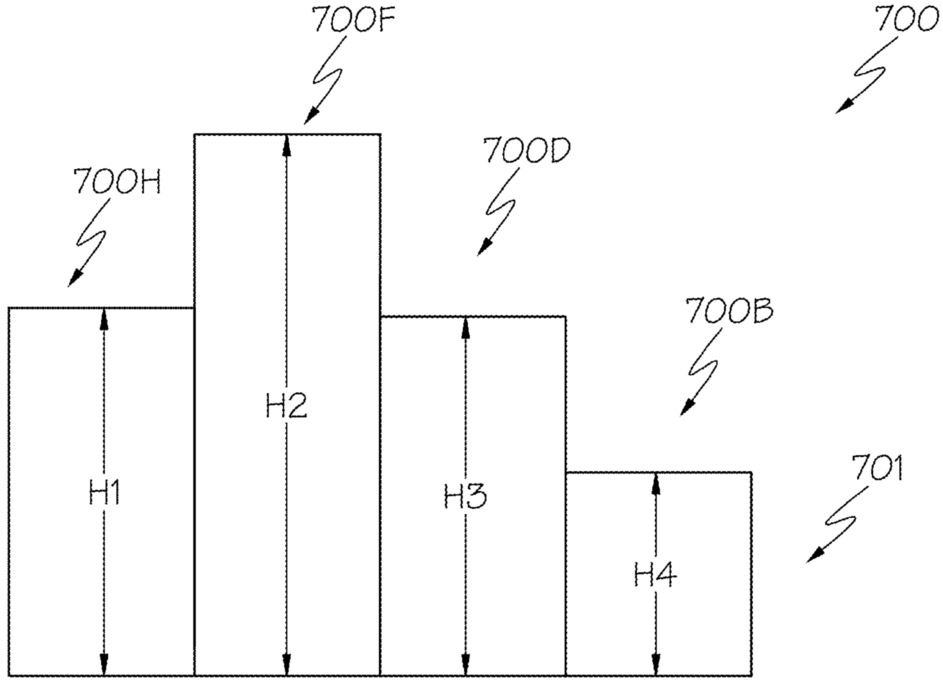
FIG. 7B schematically depicts a side view of the bladder of FIG. 7A in an inflated state, according to one or more embodiments shown and described herein.

Referring now to FIGS. 7A and 7B, a top view of another embodiment of a bladder 700 in a non-inflated state and a side view of the bladder 700 in an inflated state, respectively, are depicted. Here, the bladder 700 includes a plurality of bladder portions 700A-H arranged in a pair of rows 701 and in a side-by-side manner next to an adjacent bladder portion 700A-H in the other row 701. Although the bladder 700 is depicted as including four bladder portions 700A-H in each of a pair of rows 701, it should be appreciated that the bladder 700 may include any number of rows 701 with any number of bladder portions 700A-H in each row 701. In embodiments, the bladder portions 700A-H are each individually fluidly connected to the fluid supply device 56 (FIG. 1). In other embodiments, the bladder portions 700A-H are fluidly connected to one another and only one of the bladder portions 700A-H are fluidly connected to the fluid supply device 56 (FIG. 1). In embodiments, as shown in FIG. 7A, the bladder portions 700A-H have an identical shape with each having a cylindrical shape defining a circular cross-section. However, it should be appreciated that any of the bladder portions 700A-H may have a shape different from any of the other bladder portions 700A-H. Additionally, as shown in FIG. 7B, with the bladder portions 700A-H in the inflated state, adjacent bladder portions 700A-H within the same row 701 may have different heights. For example, a pair of first bladder portions 700A, 700B each have a first height H1, a pair of second bladder portions 700C, 700D located adjacent the pair of first bladder portions 700A, 700B each have a second height H2 greater than the first height H1, a pair of third bladder portions 700E, 700F located adjacent the pair of second bladder portions 700C, 700D each have a third height H3 less than the second height H2, and a pair of fourth bladder portions 700G, 700H located adjacent the pair of third bladder portions 700E, 700F each have a fourth height H4 less than the first height H1. However, it should be appreciated that the respective heights of the bladder portions 700A-H may be adjusted in any manner other than those specific embodiments depicted herein to result in the desired positioning of the person. Each bladder portion 700A-H is filled with a fluid by the fluid supply device 62 (FIG. 1). The bladder portions 700A-H may be filled either at the same time to the same pressure or, in embodiments, at different times to varying pressures using one or more pressure relief valves interconnecting the bladder portions 700A-H.

Figure 8A:
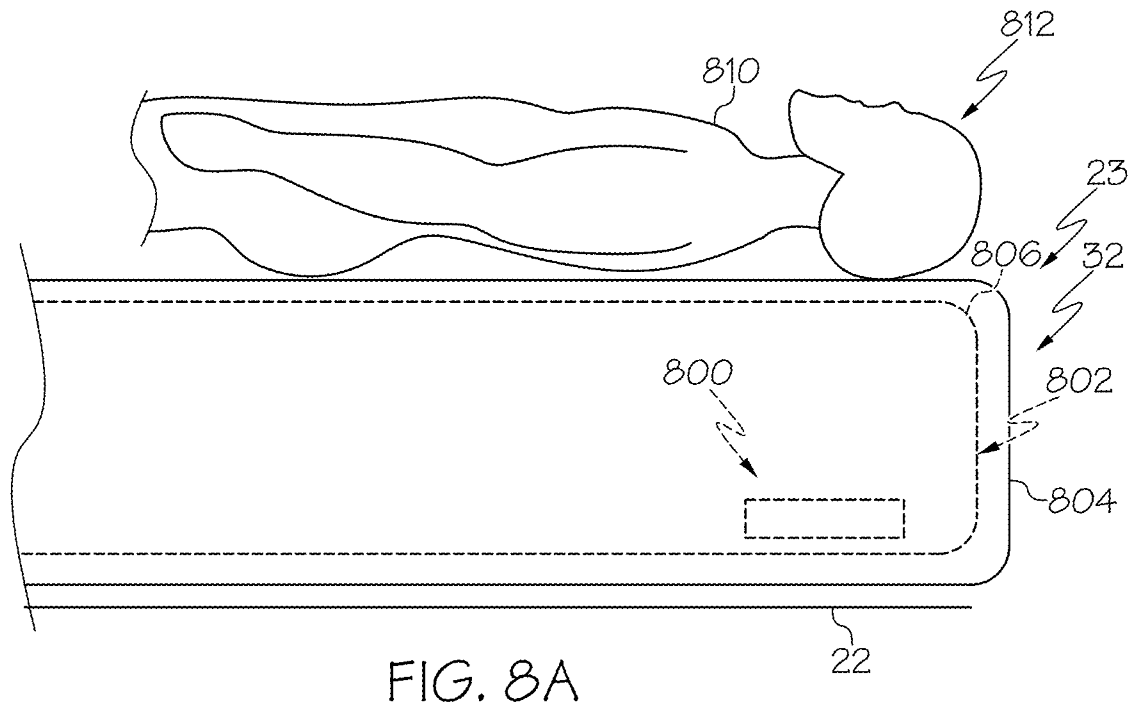
FIG. 8A schematically depicts a view of a person support apparatus and another embodiment of a bladder in a non-inflated state, according to one or more embodiments shown and described herein.
Figure 8B:
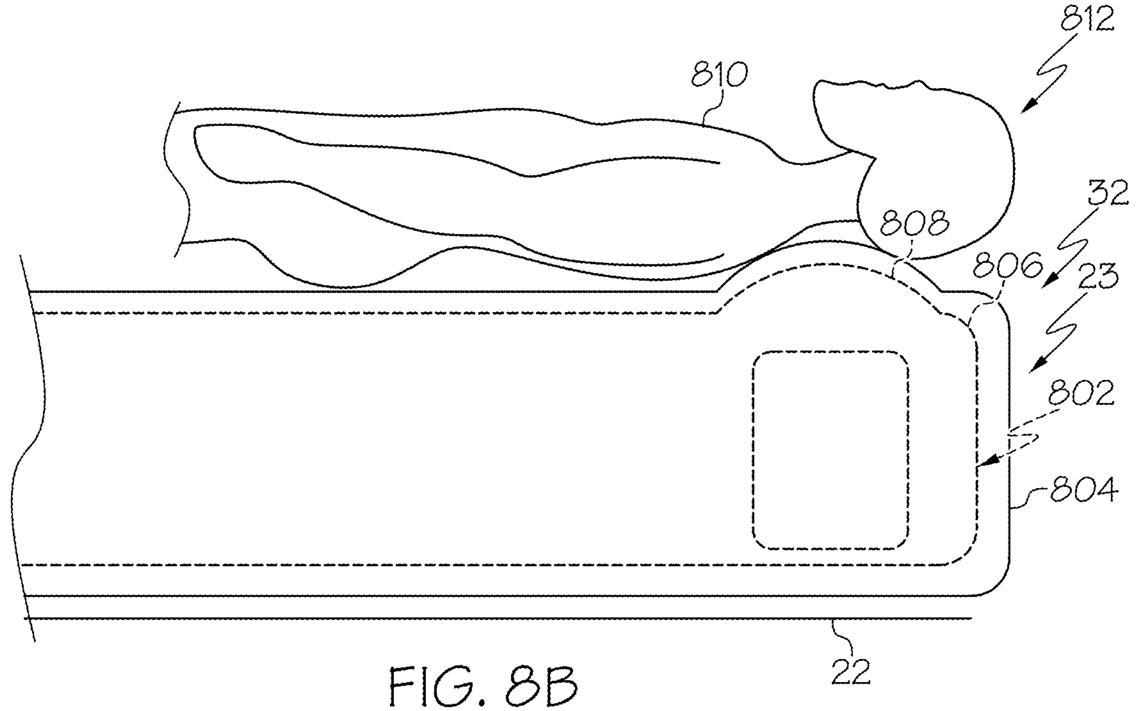
FIG. 8B schematically depicts a side view of the person support apparatus and the bladder of FIG. 8A in an inflated state, according to one or more embodiments shown and described herein.

Referring now to FIGS. 8A and 8B, side views of the person support surface 23 are depicted with an embodiment of a bladder 800 shown in a non-inflated state and an inflated state, respectively. Specifically, the person support surface 23 includes a support layer 802 and a cover 804 surrounding the support layer 802. In embodiments, the support layer 802 may be formed from any suitable compressible medium or material such as, for example, foam or the like. In the embodiment depicted in FIGS. 8A and 8B, the bladder 800, such as any one of the bladders 300, 400, 500, 600, 700 discussed above, is provided within the support layer 802. As the bladder 800 receives fluid from the fluid supply device 62 (FIG. 1), the bladder 800 transitions from the non-inflated state (FIG. 8A) to the inflated state (FIG. 8B). As a result, an upper surface 806 of the support layer 802 is deformed to form a protrusion 808, thereby raising the shoulders 810 of a person 812 supported on the person support surface 23. It should be appreciated that the bladder 800 may include one or more of the bladders described herein, for example, bladder 300 (FIG. 3A), bladder 400 (FIG. 4A), bladder 500 (FIG. 5A), bladder 600 (FIG. 6A), and/or bladder 700 (FIG. 7A).

Figure 9A:
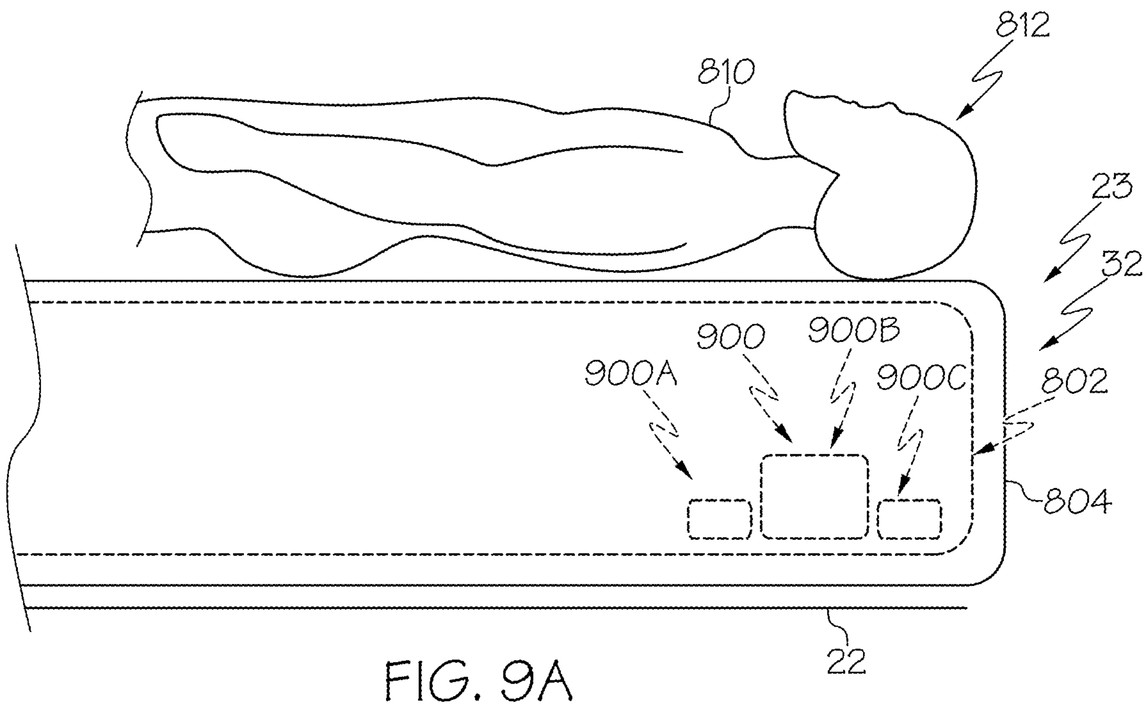
FIG. 9A schematically depicts a view of the person support apparatus and another embodiment of a bladder in a non-inflated state, according to one or more embodiments shown and described herein.
Figure 9B:
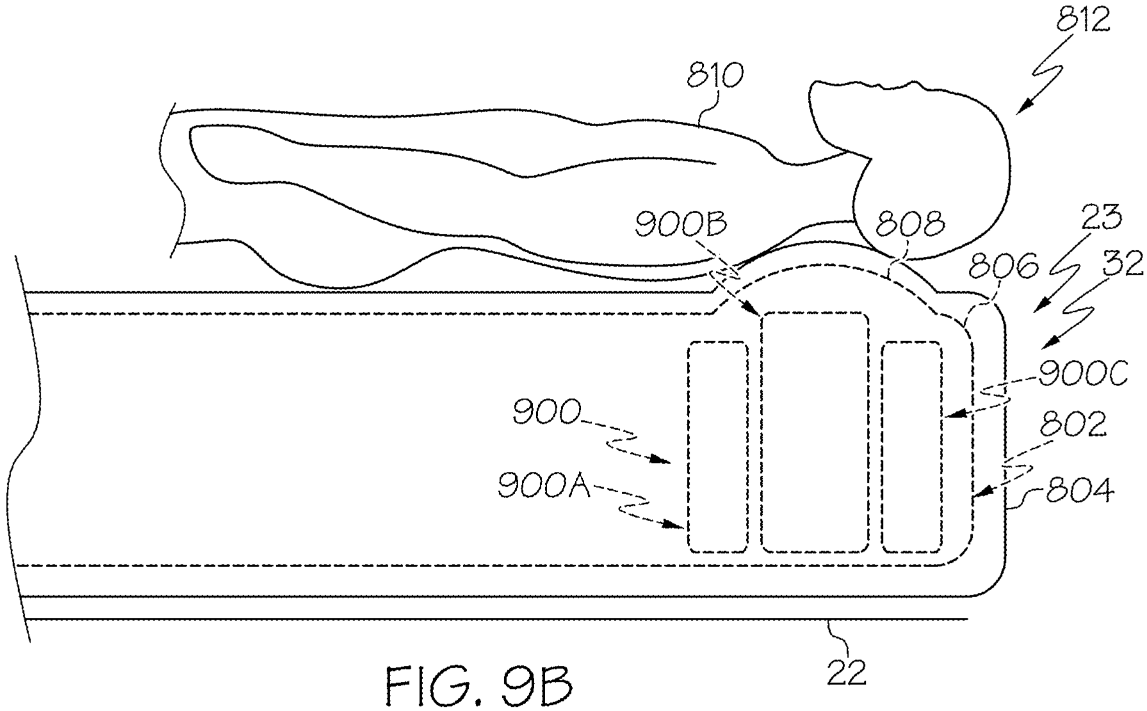
FIG. 9B schematically depicts a side view of the person support apparatus and the bladder of FIG. 9A in an inflated state, according to one or more embodiments shown and described herein.

Referring now to FIGS. 9A and 9B, side views of the person support surface 23 are depicted with an embodiment of a bladder 900 shown in a non-inflated state and an inflated state, respectively. Specifically, the bladder 900 is shown including a plurality of bladder portions 900A-C, such as the embodiment of the bladder 500 depicted in FIGS. 5A and 5B, and provided within the support layer 802. As the bladder receives fluid from the fluid supply device 62 (FIG. 1), the bladder 900 transitions from the non-inflated state (FIG. 9A) to the inflated state (FIG. 9B). As a result, the upper surface 806 of the support layer 802 is deformed to form the protrusion 808, thereby raising the shoulders 810 of the person 812 supported on the person support surface 23. It should be appreciated that the bladder 900 may include one or more of the bladders described herein, for example, bladder 300 (FIG. 3A), bladder 400 (FIG. 4A), bladder 500 (FIG. 5A), bladder 600 (FIG. 6A), and/or bladder 700 (FIG. 7A).

Figure 10A:
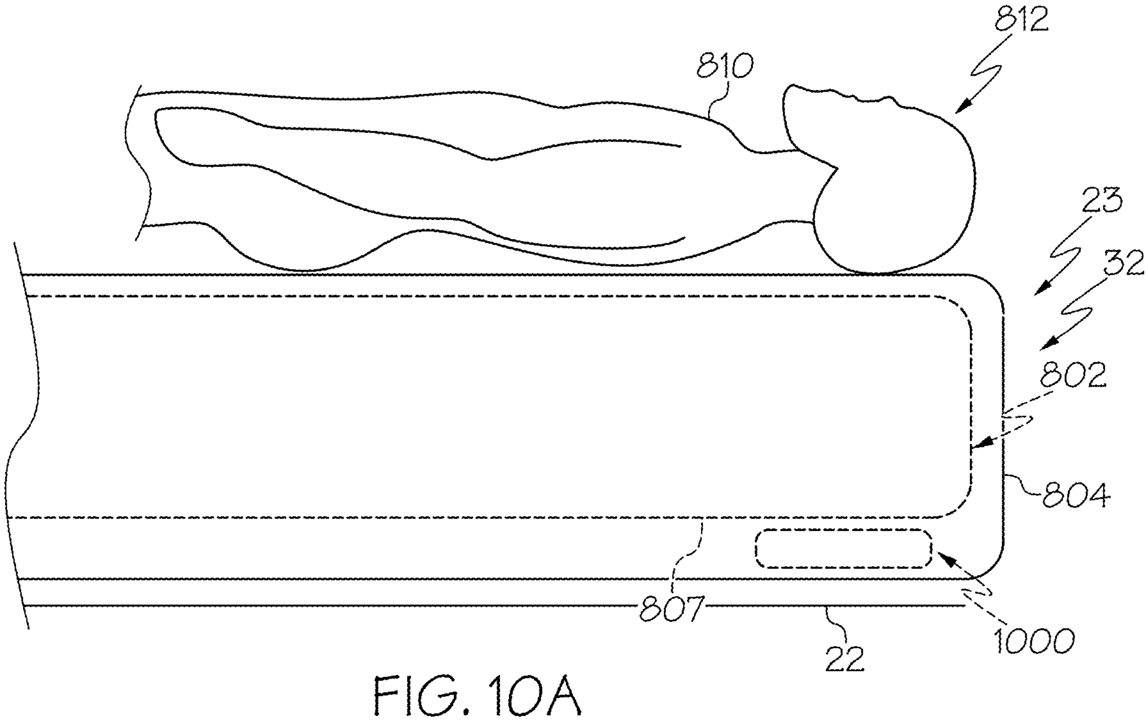
FIG. 10A schematically depicts a view of the person support apparatus and another embodiment of a bladder in a non-inflated state, according to one or more embodiments shown and described herein.
Figure 10B:
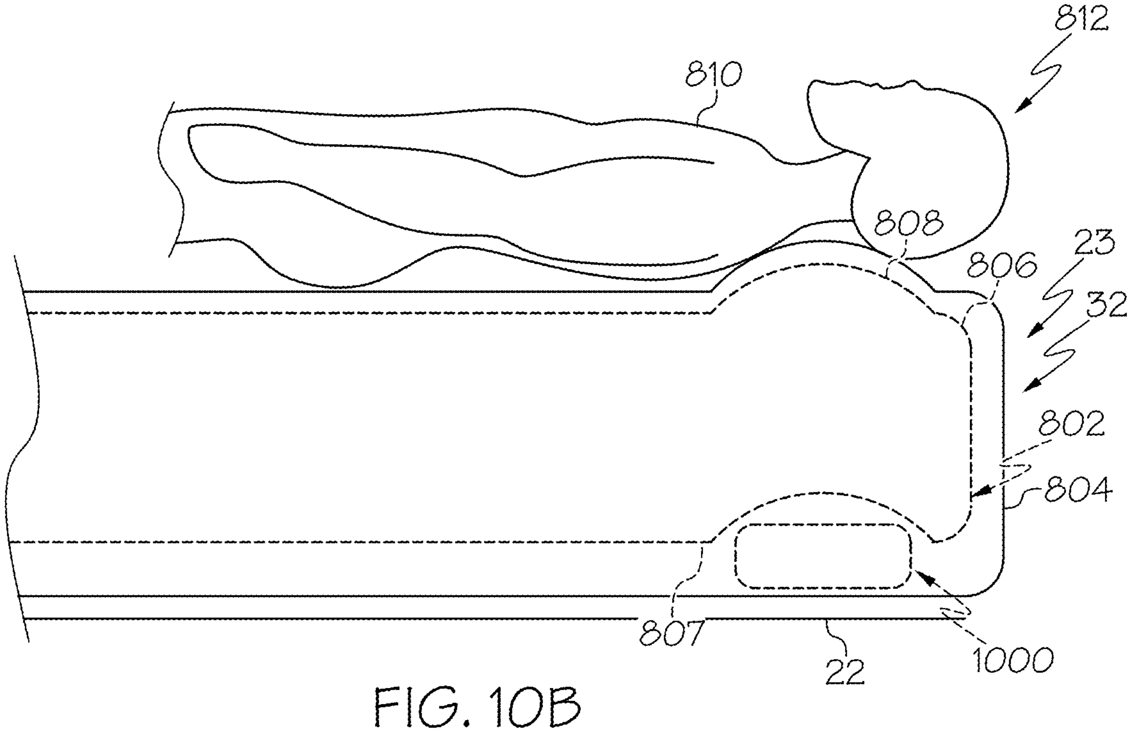
FIG. 10B schematically depicts a side view of the person support apparatus and the bladder of FIG. 10A in an inflated state, according to one or more embodiments shown and described herein.

Referring now to FIGS. 10A and 10B, side views of the person support surface 23 are depicted with an embodiment of a bladder 1000 shown in a non-inflated state and an inflated state, respectively. In the embodiment depicted in FIGS. 10A and 10B, the bladder 1000, such as any one of the bladders 300, 400, 500, 600, 700 discussed above, is provided between the cover 804 and a lower surface 807 of the support layer 802. As the bladder 1000 receives fluid from the fluid supply device 62 (FIG. 1), the bladder 1000 transitions from the non-inflated state (FIG. 10A) to the inflated state (FIG. 10B). As a result, the lower surface 807 of the support layer 802 is deformed and further deforms the upper surface 806 of the support layer 802 to form the protrusion 808, thereby raising the shoulders 810 of the person 812 supported on the person support surface 23. It should be appreciated that the bladder 100 may include one or more of the bladders described herein, for example, bladder 300 (FIG. 3A), bladder 400 (FIG. 4A), bladder 500 (FIG. 5A), bladder 600 (FIG. 6A), and/or bladder 700 (FIG. 7A).

Figure 11A:
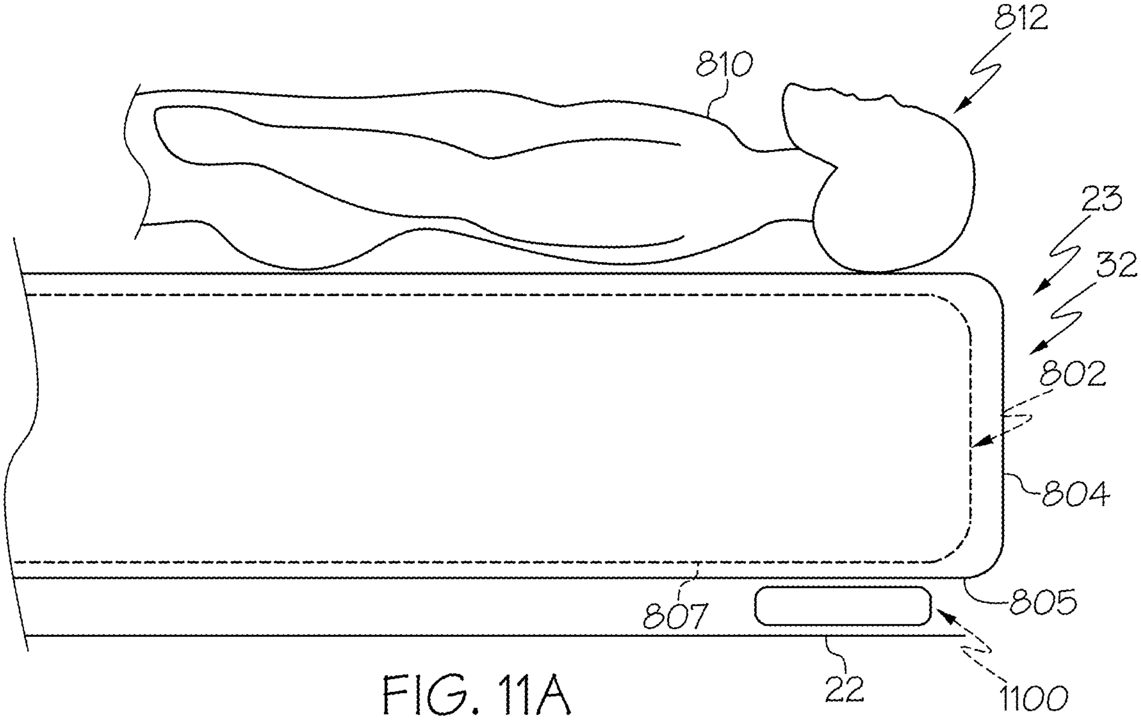
FIG. 11A schematically depicts a view of the person support apparatus and another embodiment of a bladder in a non-inflated state, according to one or more embodiments shown and described herein.
Figure 11B:
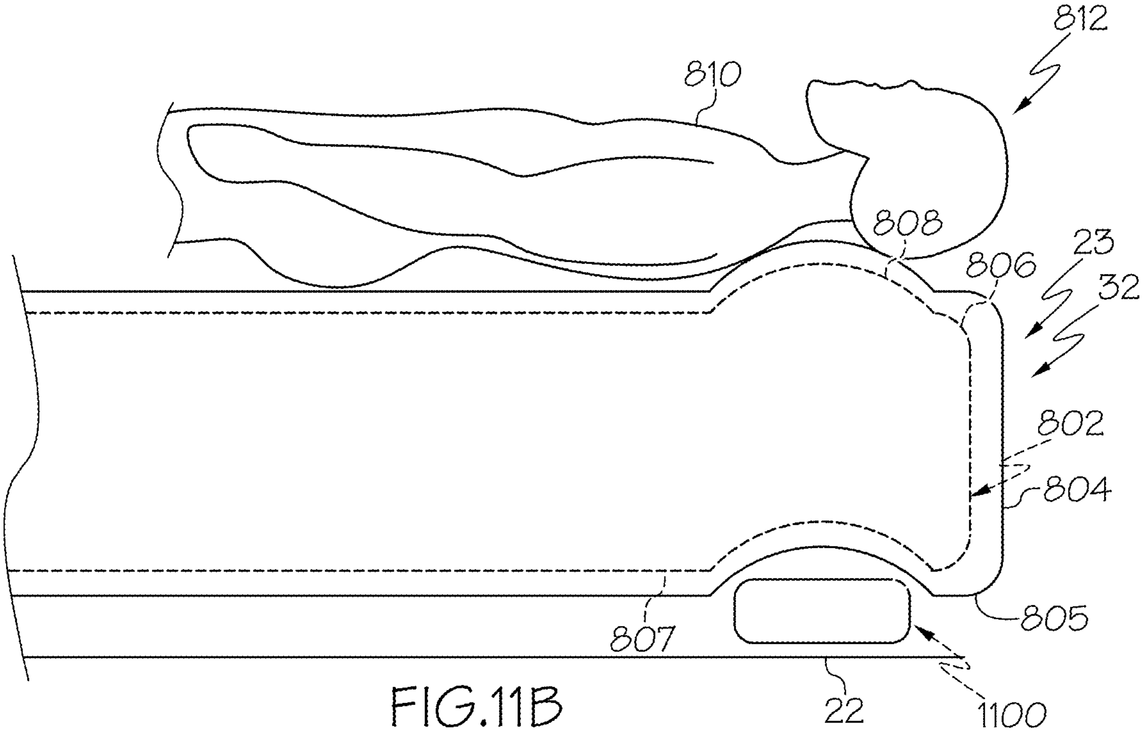
FIG. 11B schematically depicts a side view of the person support apparatus and the bladder of FIG. 11A in an inflated state, according to one or more embodiments shown and described herein.

Referring now to FIGS. 11A and 11B, side views of the person support surface 23 are depicted with an embodiment of a bladder 1100 shown in a non-inflated state and an inflated state, respectively. In the embodiment depicted in FIGS. 10A and 10B, the bladder 1100, such as any one of the bladders 300, 400, 500, 600, 700 discussed above, is provided exteriorly of the person support surface 23. Specifically, the bladder 1100 is provided at an outer surface 805 of the cover 804 on a side of the person support surface 23 opposite the person 812 between the person support surface 23 and the deck 22. As the bladder 1100 receives fluid from the fluid supply device 62 (FIG. 1), the bladder 1100 transitions from the non-inflated state (FIG. 11A) to the inflated state (FIG. 11B). As a result, the lower surface 807 of the support layer 802 is deformed so as to further deform the upper surface 806 of the support layer 802 to form the protrusion 808, thereby raising the shoulders 810 of the person 812 supported on the person support surface 23. It should be appreciated that the bladder 1100 may include one or more of the bladders described herein, for example, bladder 300 (FIG. 3A), bladder 400 (FIG. 4A), bladder 500 (FIG. 5A), bladder 600 (FIG. 6A), and/or bladder 700 (FIG. 7A).

From the above, it is to be appreciated that defined herein is a person support apparatus including a person support surface having a head section and a foot section opposite the head section, a bladder operable between a non-inflated state and an inflated state, the bladder positioned at the head section of the person support surface, and a fluid supply device for delivering a fluid to the bladder and controlling the bladder between the non-inflated state and the inflated state. As described herein, the bladder may include one or more bladder portions and each bladder portion may include one or more baffles for specifically controlling a shape of the bladder portions when in the inflated state. Additionally, as described herein, the bladder is positioned at the head section of the person support surface, either within the person support surface itself or below the person support surface, so as to position the head and shoulders of the person without requiring any external objects, which may increase risk of contamination.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. A person support apparatus, comprising:

a person support surface having a head section and a foot section opposite the head section;

a bladder positionable between a non-inflated state and an inflated state, the bladder positioned at the head section of the person support surface, the bladder comprising:

a bladder body having a front end, a rear end opposite the front end, an upper wall, and a lower wall opposite the upper wall; and a plurality of baffles spaced apart from one another along an axis extending between the front end and the rear end of the bladder body, the plurality of baffles each comprising:

an exposed portion provided at an outer surface of the upper wall of the bladder body; and an extending portion extending from opposite ends of the exposed portion and through the bladder body to the lower wall of the bladder body to restrict a height of the bladder body when in the inflated state;

a fluid supply device in fluid communication with the bladder, the fluid supply device storing a fluid; and a controller communicatively coupled to the fluid supply device and configured to operate the fluid supply device to deliver the fluid to the bladder and position the bladder between the non-inflated state and the inflated state.

2. The person support apparatus of claim 1, wherein the person support surface comprises:

a support layer; and a cover surrounding the support layer.

3. The person support apparatus of claim 2, wherein the bladder is provided within the support layer.

4. The person support apparatus of claim 2, wherein the bladder is provided between the support layer and the cover.

5. The person support apparatus of claim 2, further comprising:

a deck including an upper surface, wherein the person support surface is positioned on the upper surface of the deck, wherein the bladder is provided between the upper surface of the deck and an outer surface of the cover.

6. The person support apparatus of claim 2, wherein the support layer is formed from a compressible medium such that a protrusion is formed in an upper surface of the head section of the person support surface when the bladder is in the inflated state.

7. The person support apparatus of claim 1, wherein the plurality of baffles comprises a first baffle having a first length and positioned proximate the rear end, a second baffle having a second length and positioned proximate the front end, and a third baffle having a third length and positioned between the first baffle and the second baffle, the first length and the second length each being less than the third length.

8. The person support apparatus of claim 1, wherein the bladder comprises a plurality of bladder portions arranged along a longitudinal axis of the person support surface.

9. The person support apparatus of claim 8, wherein:

the plurality of bladder portions comprises a first bladder portion having a first height, a second bladder portion having a second height adjacent the first bladder portion, a third bladder portion having a third height adjacent the second bladder portion, and a fourth bladder portion having a fourth height adjacent the third bladder portion; and the second height is greater than the first height, the third height is greater than the second height, and the fourth height is greater than the first height and less than the second height.

10. The person support apparatus of claim 8, wherein:

the plurality of bladder portions comprises a first bladder portion having a first width and a first height, and a second bladder portion having a second width and a second height adjacent the first bladder portion; and the first width is greater than the second width, and the first height is greater than the second height.

11. The person support apparatus of claim 1, wherein the bladder comprises a plurality of bladder portions arranged in two or more rows.

12. The person support apparatus of claim 11, wherein the plurality of bladder portions have a cylindrical shape defining a circular cross-section.

13. A method, comprising:

positioning a bladder within a support layer of a person support surface of a person support apparatus and at a head section of the person support surface, the bladder comprising:

a bladder body having a front end, a rear end opposite the front end, an upper wall, and a lower wall opposite the upper wall; and a plurality of baffles spaced apart from one another along an axis extending between the front end and the rear end of the bladder body, the plurality of baffles each comprising:

an exposed portion provided at an outer surface of the upper wall of the bladder body; and an extending portion extending from opposite ends of the exposed portion and through the bladder body to the lower wall of the bladder body to restrict a height of the bladder body when in the inflated state;

transmitting a signal from a controller to a fluid supply device in fluid communication with a bladder; and delivering, by the fluid supply device in response to receiving the signal from the controller, fluid stored within the fluid supply device to the bladder to position the bladder into an inflated state from a non-inflated state, wherein, when the bladder is in the inflated state, the bladder has a varying height across a longitudinal axis of the person support surface.

14. The method of claim 13, wherein the plurality of baffles comprises a first baffle having a first length and positioned proximate the rear end, a second baffle having a second length and positioned proximate the front end, and a third baffle having a third length and positioned between the first baffle and the second baffle, the first length and the second length each being less than the third length.

15. The method of claim 13, wherein:

the bladder comprises a plurality of bladder portions arranged along a longitudinal axis of the person support surface;

the plurality of bladder portions comprises a first bladder portion having a first height, a second bladder portion having a second height adjacent the first bladder portion, a third bladder portion having a third height adjacent the second bladder portion, and a fourth bladder portion having a fourth height adjacent the third bladder portion; and the second height is greater than the first height, the third height is greater than the second height, and the fourth height is greater than the first height and less than the second height.

16. The method of claim 13, wherein:

the bladder comprises a plurality of bladder portions arranged along a longitudinal axis of the person support surface;

the plurality of bladder portions comprises a first bladder portion having a first width and a first height, and a second bladder portion having a second width and a second height adjacent the first bladder portion; and the first width is greater than the second width, and the first height is greater than the second height.

17. The method of claim 13, wherein the bladder comprises a plurality of bladder portions arranged in two or more rows.

18. The method of claim 17, wherein the plurality of bladder portions have a cylindrical shape defining a circular cross-section.

* * * * *